United States Patent
Vaughn

(10) Patent No.: US 10,730,334 B1
(45) Date of Patent: Aug. 4, 2020

(54) THERMOSENSITIVE RECORDING MATERIAL

(71) Applicant: OMNOVA Solutions Inc., Beachwood, OH (US)

(72) Inventor: James L. Vaughn, Hudson, OH (US)

(73) Assignee: OMNOVA Solutions Inc., Beachwood, OH (US)

( * ) Notice: Subject to any disclaimer, the term of this patent is extended or adjusted under 35 U.S.C. 154(b) by 15 days.

(21) Appl. No.: 15/960,148

(22) Filed: Apr. 23, 2018

Related U.S. Application Data

(60) Provisional application No. 62/488,295, filed on Apr. 21, 2017.

(51) Int. Cl.

| | | |
|---|---|---|
| *B41M 5/50* | (2006.01) | |
| *B41M 5/52* | (2006.01) | |
| *B41M 5/00* | (2006.01) | |
| *C08F 220/18* | (2006.01) | |
| *C08L 25/14* | (2006.01) | |
| *D21H 19/22* | (2006.01) | |

(52) U.S. Cl.
CPC ........ *B41M 5/5254* (2013.01); *B41M 5/0052* (2013.01); *C08F 220/18* (2013.01); *C08L 25/14* (2013.01); *C08F 2800/20* (2013.01); *C08L 2207/53* (2013.01); *D21H 19/22* (2013.01); *Y10T 428/2998* (2015.01)

(58) Field of Classification Search
CPC ............................ D21H 19/22; Y10T 428/2998
USPC ....................................................... 428/32.72
See application file for complete search history.

(56) References Cited

U.S. PATENT DOCUMENTS

| | | |
|---|---|---|
| 5,157,084 A | 10/1992 | Lee |
| 5,500,286 A | 3/1996 | Someya |
| 5,510,422 A | 4/1996 | Blankenship |
| 5,521,253 A | 5/1996 | Lee |
| 6,514,909 B1 | 2/2003 | Austin |
| 6,780,820 B2 | 8/2004 | Bobsein |
| 7,192,542 B2 | 3/2007 | Ugazio |
| 2008/0041544 A1 | 2/2008 | Tsavalas et al. |
| 2008/0311416 A1 | 12/2008 | Keefe et al. |
| 2009/0087662 A1* | 4/2009 | Yoshitani .................. C08F 2/24 428/407 |
| 2010/0136356 A1 | 6/2010 | Kelly et al. |
| 2012/0136078 A1 | 5/2012 | Brennan et al. |
| 2015/0072147 A1 | 3/2015 | Brennan et al. |
| 2016/0068640 A1 | 3/2016 | Brennan et al. |

FOREIGN PATENT DOCUMENTS

| | | |
|---|---|---|
| EP | 0 022 633 A2 | 1/1981 |
| EP | 0 426 391 A2 | 5/1991 |
| EP | 0 467 646 A2 | 1/1992 |
| EP | 0 565 244 A1 | 10/1993 |
| EP | 0 842 992 A2 | 5/1998 |
| EP | 1 325 936 A1 | 7/2003 |
| EP | 1 440 997 A1 | 7/2004 |
| WO | 2008126521 A1 | 10/2008 |
| WO | 2010120344 A1 | 10/2010 |

* cited by examiner

*Primary Examiner* — Betelhem Shewareged
(74) *Attorney, Agent, or Firm* — Renner, Kenner, Greive, Bobak, Taylor & Weber Co. LPA; David G. Burleson

(57) ABSTRACT

A thermosensitive recording material comprising a support; an insulating layer that includes a porous polymeric pigment; and an image-forming layer.

17 Claims, 1 Drawing Sheet

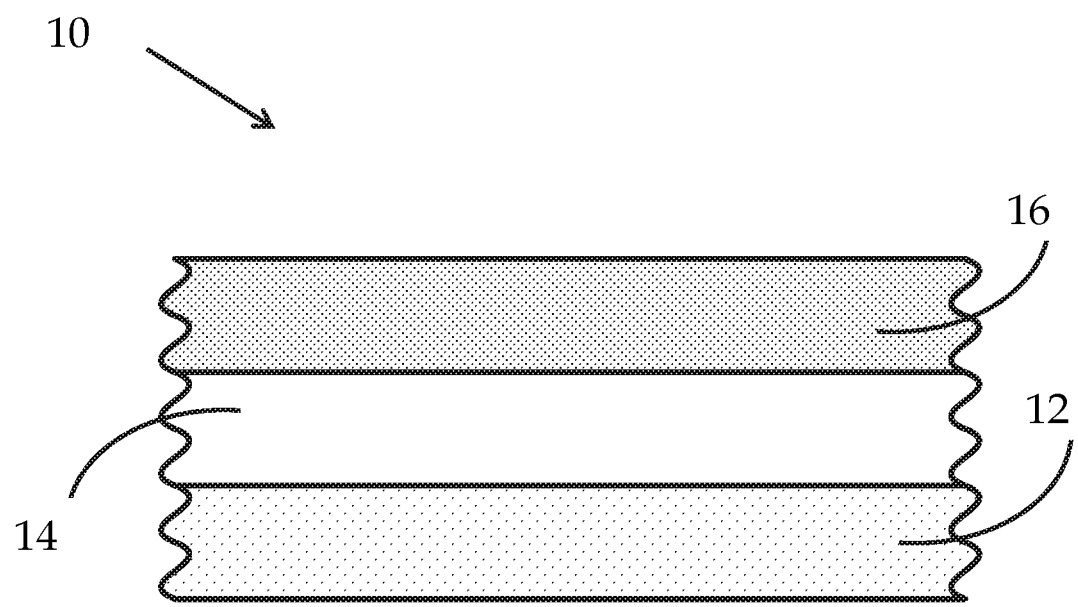

THERMOSENSITIVE RECORDING MATERIAL

This application claims the benefit of U.S. Provisional Application Ser. No. 62/488,295 filed on Apr. 21, 2017, which is incorporated herein by reference.

FIELD OF THE INVENTION

Embodiments of the invention are directed toward thermosensitive recording materials, also known as thermal papers, that include a hollow polymeric pigment with a porous shell.

BACKGROUND OF THE INVENTION

Thermosensitive recording materials generally include an image forming layer situated on a substrate. The image forming layer includes a thermoresponsive dye, which upon heating changes color to produce a visible image or marking on the thermosensitive recording material. An image or a marking may be formed on a thermosensitive recording material using a printer with a thermal head, a thermal pen, laser light, or in some instances, friction across the material will generate enough heat to produce a mark or an image.

Some thermosensitive recording materials include an insulating layer, which may employ voided particles to provide insulating properties to the thermosensitive recording material. Insulating layers may provide a thermosensitive recording paper with improved print density and clearer printed images. Voided particles typically have a single void entirely encapsulated by a polymer shell.

Multi-voided particles have also been employed in the art for use in insulating layers. U.S. Pat. Pub. No. 2002/0123425 discloses a thermosensitive recording material with a first layer that includes multi-voided particles. Suitable multi-voided particles are described as being prepared from a core-shell emulsion polymerization process in which the core polymer contains a copolymerized ester functional group-monomer, such as methyl acrylate, methyl methacrylate, and vinyl acetate, which may be hydrolyzed to form multiple voids within the particle when dried.

Presently there is a need in the art to prepare thermosensitive recording materials with improved insulating properties.

SUMMARY OF THE INVENTION

On or more embodiments provides a thermosensitive recording material comprising: a support; an insulating layer that includes a porous polymeric pigment; and an image-forming layer.

Another embodiment provides a thermosensitive recording material comprising: a support; an insulating layer; an absorption layer that includes a porous polymeric pigment; and an image-forming layer.

BRIEF DESCRIPTION OF THE DRAWINGS

The FIGURE provides a partial sectional view of a thermosensitive recording of one or more embodiments of the invention.

DETAILED DESCRIPTION OF ILLUSTRATIVE EMBODIMENTS

Embodiments of the invention are based, at least in part, on the discovery that highly porous hollow polymeric pigments may advantageously be used in thermosensitive recording materials. While the prior art contemplates the use of porous hollow polymeric pigments in thermosensitive recording materials, the porous hollow polymeric pigments employed in the present invention have higher porosity than those porous hollow polymeric pigments previously used in thermosensitive recording materials. By employing porous hollow polymeric pigments with higher porosity, unexpected results, relative to their use in thermosensitive recording materials, are contemplated. According to embodiments of the present invention, the highly porous hollow polymeric pigments may be used in an insulating layer of a thermosensitive recording material. In these or other embodiments, the highly porous hollow polymeric pigments may be used in an absorption layer of a thermosensitive recording material. In other embodiments, the highly porous hollow polymeric pigments may be used in a hybrid layer that provides both insulation and absorption in a thermosensitive recording material.

Thermosensitive Recording Material

With reference to the FIGURE, thermosensitive recording material 10 is shown and includes a substrate 12, and an insulating layer 14 situated on substrate 12. Between substrate 12 and insulating layer 14 may optionally be a primer layer or coat (not shown). Situated on insulating layer 14 is an image-forming layer 16. A primer layer or coat (not shown) may optionally be disposed between insulating layer 14 and image-forming layer 16. Other layers, such as coating layers or multiple successive repeating insulating layers, optional absorption layers, optional primer layers, and multiple image-forming layers may be included. Embodiments may also include dual-sided thermosensitive recording materials, where the thermosensitive recording material has at least one image-forming layer on each side of the substrate.

Porous Polymeric Pigment

In one or more embodiments, porous hollow polymeric pigments, which may be referred to as porous hollow particles, suitable for use in a thermosensitive recording material according to the present invention include particles with multiple pores that extend from the surface of the particle to the hollow interior of the particle. In one or more embodiments, the porous hollow particles may be prepared from a core-shell polymeric particle. As those skilled in the art will appreciate, a core-shell polymeric particle includes a polymeric core surrounded by a shell that includes a different polymer composition than the core. The core-shell particle may optionally include one or more intermediate shells on layers between the core and the shell. For example, in one or more embodiments, the core-shell polymeric particle may include a shell formed from a polymer with units derived from styrene and acrylate monomers and a core formed from a polymer with units derived from hydrolyzable monomer such as acrylate monomers. In these or other embodiments, a porous hollow particle may be prepared by subjecting the core-shell polymeric particle to conditions that will hydrolyze the polymer or polymeric units deriving from the polymerization of acrylate monomer to thereby provide the resulting hollow, porous structure.

The core-shell polymeric particle may be prepared by a multistage polymerization. For example, the core-shell polymeric particle may be prepared by an emulsion polymerization process using discrete charges of one or more monomers or using a continuously-varied charge of two or more monomers. The core may be prepared first and the shell or shells are subsequently polymerized. An example of porous polymeric pigments produced with the inclusion of acrylate monomers in the shell formation is described in WO 2010/120344, which is incorporated herein by reference in its entirety.

Core

In one or more embodiments, the core of the core-shell polymer particle may comprise a homopolymer or copolymer that is swellable upon neutralization or hydrolysis. In these or other embodiments, at least one of the monomers polymerized to form the core bears or results in a unit that upon contact with a base can be hydrolyzed, neutralized, or a combination thereof. In one or more embodiments, the core may optionally include crosslinking.

In one or more embodiments, the core may be characterized by the quantity of neutralizable units, which can be described with reference to the weight percent monomer feed giving rise to these units. In one or more embodiments, the core is prepared by including (i.e. polymerizing) at least 5 wt %, in other embodiments at least 10 wt %, in other embodiments at least 25 wt %, in other embodiments at least 40 wt %, and in other embodiments at least 50 wt %, monomers that result in a neutralizable unit relative to the total weight of monomer used to polymerize the core. In these or other embodiments, the core is prepared by including at most 100 wt %, in other embodiments at most 99 wt %, in other embodiments at most 95 wt %, and in other embodiments at most 90 wt %, and in other embodiments at most 70 wt %, monomers that result in a neutralizable unit relative to the total weight of monomer used to polymerize the core. In one or more embodiments, the core is prepared by including from about 5 wt % to about 100 wt %, in other embodiments about 10 wt % to about 99 wt %, in other embodiments about 25 wt % to about 95 wt %, in other embodiments about 40 wt % to about 90 wt %, and in other embodiments about 50 wt % to about 70 wt %, monomers that result in a neutralizable unit relative to the total weight of monomer used to polymerize the core.

In one or more embodiments, the core may be characterized by the quantity of hydrolyzable units, which can be described with reference to the weight percent monomer feed giving rise to these units. In one or more embodiments, the core is prepared by including at least 5 wt %, in other embodiments at least 10 wt %, in other embodiments at least 25 wt %, in other embodiments at least 40 wt %, and in other embodiments at least 50 wt %, monomers that result in a hydrolyzable unit relative to the total weight of monomer used to polymerize the core. In these or other embodiments, the core is prepared by including at most 100 wt %, in other embodiments at most 99 wt %, in other embodiments at most 95 wt %, and in other embodiments at most 90 wt %, and in other embodiments at most 70 wt %, monomers that result in a hydrolyzable unit relative to the total weight of monomer used to polymerize the core. In one or more embodiments, the core is prepared by including from about 5 wt % to about 100 wt %, in other embodiments about 10 wt % to about 99 wt %, in other embodiments about 25 wt % to about 95 wt %, in other embodiments about 40 wt % to about 90 wt %, and in other embodiments about 50 wt % to about 70 wt %, monomers that result in a hydrolyzable unit relative to the total weight of monomer used to polymerize the core.

Suitable monomers that can be used to give rise to a polymeric unit that may be hydrolyzed include acrylate monomers (which do not include methacrylates, e.g. methyl methacrylate). Specific examples of acrylate monomers include methyl acrylate, ethyl acrylate, butyl acrylate, hexyl acrylate, 2-ethyl hexyl acrylate, octyl acrylate and iso-octyl acrylate, n-decyl acrylate, iso-decyl acrylate, tertbutyl acrylate, 2-hydroxyethyl acrylate, and acrylamide.

Suitable monomers that can be used to give rise to a polymeric unit that may be neutralized include acid monomers. Specific examples of acid monomers include acrylic acid, methacrylic acid (i.e. methacrylates), (meth)acryloxypropionic acid, itaconic acid, aconitic acid, maleic acid or anhydride, fumaric acid, crotonic acid, monomethyl maleate, monomethyl fumarate, and monomethyl itaconate.

Other suitable monomers that may make up the balance of the core include acrylates of methacrylic acid. Exemplarily acrylates of methacrylic acid include methyl methacrylate, butyl methacrylate, hexyl methacrylate, isobutyl methacrylate, isopropyl methacrylate and allyl methacrylate.

In one or more embodiments, the core of the core-shell polymeric particle may include, but is not limited to, an acid core and/or an ester core. Examples of core-shell polymeric particles that include an acid core are described in U.S. Pat. No. 4,468,498 to Kowalski, which is incorporated herein by reference in its entirety. Examples of core-shell polymeric particles that include an ester core are described in U.S. Pat. Nos. 5,157,084 and 5,521,253 to Lee, and U.S. Patent Publication 2010/0317753, all of which are incorporated herein by reference in their entirety.

Shell

In one or more embodiments, the shell of the core-shell polymer particle may comprise a copolymer that includes a unit or units that are hydrolyzable and a unit or units that are non-hydrolyzable. As suggested above, the core-shell polymer particle may be subjected to conditions that hydrolyze that hydrolyzable unit to produce the pores of the porous polymeric pigment. The non-hydrolyzable units remain to produce or form the porous shell. As noted above, suitable hydrolyzable units include those derived from acrylates.

In one or more embodiments, the shell may be characterized by the quantity of hydrolyzable units, which can be described with reference to the weight percent monomer feed giving rise to these units. In one or more embodiments, the shell is prepared by using at least 2%, in other embodiments at least 5 wt %, and in other embodiments at least 10 wt %, monomers that result in a hydrolyzable unit relative to the total weight of monomer used to polymerize the shell. In these or other embodiments, the shell is prepared by using at most 35 wt %, in other embodiments at most 30 wt %, and in other embodiments at most 25 wt %, monomers that result in a hydrolyzable unit relative to the total weight of monomer used to polymerize the shell. In one or more embodiments, the shell is prepared by using about 2 wt % to about 35 wt %, in other embodiments about 5 wt % to about 30 wt %, and in other embodiments about 10 wt % to about 25 wt %, monomers that result in a hydrolyzable unit relative to the total weight of monomer used to polymerize the shell.

Suitable monomers that can be used to give rise to a polymeric unit that is non-hydrolyzable include styrene, vinyltoluene, ethylene, vinyl acetate, vinyl chloride, vinylidene chloride, acrylonitrile, methacrylamide, and esters of methacrylic acid.

In one or more embodiments, acrylic acid monomer may be included during the formation of the shell. In one or more embodiments, the amount of acrylic acid may be less than 5 wt %, in other embodiments less than 4 wt %, in other embodiments less than 3 wt % in other embodiments less than 2 wt %, and in other embodiments less than 1 wt % relative to the total weight of monomer used to polymerize the shell. In one or more embodiments, the amount of acrylic acid may be from about 0.1 wt % to about 5 wt %, in other embodiments from about 0.3 wt % to about 4 wt %, in other embodiments from about 0.7 wt % to about 3 wt %, and in other embodiments about 1 wt % to about 2 wt % relative to the total weight of monomer used to polymerize the shell.

In one or more embodiments, the core-shell particle may include one or more optional intermediate stage or layers. An intermediate stage may be situated between the core and the shell of the core-shell polymer particle. Suitable intermediate stage may be prepared from a polymer blend that is compatible with the core and/or the shell.

Hydrolyzation

As noted above, the porous polymeric particles employed in the present invention may be prepared by subjecting the core-shell polymeric particle to conditions that will hydrolyze the units deriving from the polymerization of acrylate monomer to thereby produce the hollow, porous structure. In these or other embodiments, the hydrolyzation reaction may be performed by adding a base to the core-shell polymeric particles. In one or more embodiments, the base may be added to the emulsion polymerization mixture after the preparation of the core-shell polymeric particles. In other embodiments, core-shell polymeric particles that are pre-prepared may be hydrolyzed in the presence of a base. Suitable bases include ammonia, sodium hydroxide, potassium hydroxide and/or amines.

The hydrolysis conditions, such as time, temperature, and pressure, required to prepare a porous polymeric particle from a core-shell polymeric particle may depend on the specific types and amounts of hydrolyzable monomers used prepare the core-shell polymeric particle as well as the specific temperature, pressure used, and the amount and type of base employed. Accordingly, specific hydrolyzable conditions cannot be definitively set forth except to say that hydrolyzation may occur under hydrolyzable conditions, and those skilled in the art can readily ascertain the appropriate conditions in view of the teachings herein.

In one or more embodiments, the porous hollow particles may be prepared at a temperature of at least 100° C., in other embodiments at least 140° C., and in other embodiments at least 155° C. In these or other embodiments, the porous hollow particles may be prepared at a temperature of at most 200° C., in other embodiments at most 190° C., and in other embodiments at most 180° C. In one or other embodiments, the porous hollow particles may be prepared at a temperature from about 100° C. to about 200° C., in other embodiments from about 140° C. to about 190° C., and in other embodiments at least from about 155° C. to about 180° C.

In one or other embodiments, the hydrolysis reaction to prepare the porous hollow particles may take at least 60 min, in other embodiments at least 90 min, and in other embodiments at least 120 min. In these or other embodiments, the hydrolysis reaction to prepare the porous hollow particles of at most 1440 min, in other embodiments at most 720 min, and in other embodiments at most 480 min. In one or other embodiments, the hydrolysis reaction to prepare the porous hollow particle may take from about 60 min to about 1440 min, in other embodiments from about 90 min to about 720 min, and in other embodiments at least from about 120 min to about 480 min.

Porous Polymeric Pigment Properties

As noted above, the porous hollow particles may be a hollow polymeric pigment with a porous outer shell. The porous hollow particles may be characterized by a pore surface area. In one or more embodiments, the pore surface area can be determined analytically using SEM images in conjunction with the following calculations. As the skilled person understands, reference can be made to the difference between a total theoretical exterior surface area (e.g., total theoretical exterior surface area=$4\pi r^2$ for an assumed spherical particle) and an actual exterior surface area. To determine pore surface area, some inferences from the data are used. First, the only pore areas reliably illustrated and measurable are located on the top surface of the hollow porous structure of the organic polymeric particle, which is likely only the middle third of the projected diameter that is seen in the images. This is due to the fact that the pores that are further toward the side of the organic polymeric particle are at an angle, so that the projected cross-section of the pore is less than the true cross-section of the pore. Second, the SEM shows a straight-down projection of the sphere, so the "area" of the hollow porous structure of the organic polymeric particle that is measured is off by a factor of two. The weighted average of the largest 10 percent of the pores is used as the pore size.

To estimate the pore area as a fraction of a sphere surface, it is estimated that the SEM images provide an image of only a portion of the organic polymeric particle, termed a "cap." The cap is created by cutting the sphere with a plane:

$$S=2\pi rh$$

where S is the surface area of the cap; r is the radius of the spherical organic polymeric particle; and h is the height of the cap above the intersecting plane.

If c is defined as the fractional radius of the base of the cap compared to the radius of the sphere, then:

$$S = 2\pi r^2\left(1 - \sqrt{(1-c^2)}\right)$$

In one or more embodiments, the porous hollow particles may have a pore surface area of at least 1%, in other embodiments at least 3%, in other embodiments at least 5%, in other embodiments at least 7%, and in other embodiments at least 10%. In these or other embodiments, the porous hollow particles may have a pore surface area of at most 50%, in other embodiments at most 45%, in other embodiments at most 40%, in other embodiments at most 35%, and in other embodiments at most 30%. In one or more embodiments, the porous hollow particles may have a pore surface area from about 1% to about 50%, in other embodiments from about 3% to about 45%, in other embodiments from about 5% to about 40%, in other embodiments from about 7% to about 35% and in other embodiments from about 10% to about 30%.

In one or more embodiments, relative degree of porosity of the porous hollow particles can be determined with reference to the void volume fraction. The void volume fraction is the volume fraction of the organic polymeric particle that is not occupied by the polymer forming the organic polymeric particle. The void volume fraction may be determined by centrifugation. The latex may be placed in a centrifuge and spun. After sufficient centrifugation, the supernatant is decanted and weighed. From the latex mass, percent solids, and supernatant mass the void volume fraction ($f_{void}$) is determined using the following equations:

$$f_{void}=((V_T-S_{H_2O})*(F_R-Vp))/((V_T-S_{H_2O})*F_R)$$

where:

Vp=Polymer volume (polymer mass/polymer density) where the density of copolymers is calculated using literature values for the density of the homopolymer of each monomer, and assuming that the density of the copolymer is a linear function of the composition of the copolymer. See Peter A. Lovell and Mohamed S. El-Aasser, "Emulsion Polymerization and Emulsion Polymers"; p. 624, John Wiley and Sons: New York (1997), which is incorporated herein by reference in its entirety.

$V_T$=total volume in the tube (mass latex/density of latex)
$S_{H_2O}$=volume of supernatant=weight of supernatant
$F_R$=packing factor equals 0.64 for random packing of essentially monodisperse spheres. The packing factor is a correction corresponding to the volume fraction of solids in the hard pack.

The skilled person will appreciate that void volume accounts for interior void volume and shell void volume of a particle. Thus, where two particle populations having similar interior void volume are compared, the particle population with a higher void volume will have greater shell void volume (i.e. greater porosity).

In one or more embodiments, the porous polymeric pigment may have a void volume fraction of at least 40%, in other embodiments at least 45%, in other embodiments at least 50%, in other embodiments at least 55%, and in other embodiments at least 60%. In these or other embodiments, the porous polymeric pigment may have a void volume fraction of at most 85%, in other embodiments at most 83%, in other embodiments at most 80%, in other embodiments at most 78%, and in other embodiments at most 75%. In one or more embodiments, the porous polymeric pigment may have a void volume fraction from about 40% to about 85%, in other embodiments from about 45% to about 83%, in other embodiments from about 50% to about 80%, in other embodiments from about 55% to about 77% and in other embodiments from about 60% to about 75%.

In one or more embodiments, the porous hollow particles may be characterized by an average particle size, which may be measured by hydrodynamic chromatography. In one or more embodiments, the porous hollow particles may have an average particle size (i.e. particle diameter) of at least 0.5 µm, in other embodiments at least 0.6 µm, in other embodiments at least 0.7 µm, in other embodiments at least 0.9 µm, in other embodiments at least 1.0 µm, in other embodiments at least 1.1 µm, in other embodiments at least 1.3 µm, and, in other embodiments at least 1.4 µm. In these or other embodiments, the porous hollow particles may have an average particle size of at most 3.0 µm, in other embodiments at most 2.5 µm, in other embodiments at most 2.2 µm, in other embodiments at most 2.0 µm, in other embodiments at most 1.9 µm, in other embodiments at most 1.8 µm, in other embodiments at most 1.7 µm, and in other embodiments at most 1.5 µm. In one or more embodiments, the porous hollow particles may have an average particle size of from about 0.5 to about 3.0 µm, in other embodiments about 0.6 to about 2.5 µm, in other embodiments from about 0.7 to about 2.2 µm, in other embodiments from about 0.9 to about 2.0 µm, in other embodiments from about 1.0 to about 1.9 µm, in other embodiments from about 1.1 to about 1.8 µm, in other embodiments from about 1.3 to about 1.7 µm, in other embodiments from about 1.4 to about 1.5 µm, in other embodiments from about 1.1 to about 3.0 µm, in other embodiments from about 1.2 to about 2.9 µm, in other embodiments from about 1.3 to about 2.8 µm, in other embodiments from about 0.2 to about 1.0 µm, in other embodiments from about 0.3 to about 0.9 µm, in other embodiments from about 0.4 to about 0.8 µm, and in other embodiments from about 0.5 to about 0.7 µm.

Substrate

As noted above, the thermosensitive recording material includes a substrate. The substrate may serve as a support for the various layers of the thermosensitive recording material. In one or more embodiments, suitable substrate for use in the thermosensitive recording material may be a sheet or a plate. The substrate may be made of metal, plastic, paper, or paper board. In one or more embodiments, the substrate may include an adhesive backing.

Insulating Layer

As noted above, the insulating layer of the thermosensitive recording material includes hollow particles as described herein. For example, the porous hollow particles may be included in the binder of a paper coating.

In one or more embodiments, the binders may also include synthetic latexes, a starch or other natural binder such as a protein (e.g. soy, casein, albumin), polyvinyl alcohol, carboxymethyl cellulose, hydroxymethyl cellulose, polyvinyl alcohols, polyacrylate salt, and mixtures thereof.

Specific latexes include those selected from the group of a polymerized form of styrene, butadiene, acrylonitrile, butyl acrylate, methyl methacrylate, styrene-butadiene, styrene-butadiene-acrylonitrile, styrene-acrylic, styrene-butadiene-acrylic, vinyl acetate, and mixtures thereof. Additional examples of monomers that can be used in the preparation of synthetic latex include mixtures of ethylene and vinyl acetate, and esters of acrylic acid and/or methacrylic acid. In certain embodiments, the latex binder may be carboxylated. For example, the synthetic latex binders provided herein can be carboxylated, i.e. copolymerized with a carboxylic acid.

In one or more embodiment, the binder of the insulating composition may be an aqueous dispersion of a polymer. As appreciated, the aqueous portion of the binder is evaporated or almost entirely evaporated during the manufacture of the thermosensitive recording material, as discussed herein. In one embodiment, the synthetic latex binder is an example of such an aqueous dispersion of a polymer. In addition, the synthetic latex can have a monomodal or polymodal, e.g., bimodal, particle size distribution. Mixtures of binders can also be used in the paper coating composition.

A wide variety of commercially available binders are available. Examples of suitable latex binders include: CP 615NA, CP 638NA, DL 920, DL 966, PROSTAR 5401, and CP 692NA, manufactured by The Dow Chemical Company; GenFlo 557 and GenFlo 576, manufactured by Omnova Solutions Inc.; and Acronal S 504 and Acronal S 728, manufactured by BASF Corporation. A suitable starch binder can include Penford Gum PG290 (Penford Products Co., Cedar Rapids Iowa).

In one or more embodiments, the insulating layer may be characterized by the amount of porous hollow particles in the layer, which may be defined, on dry weight basis, based on the weight of porous hollow particles in the composition (i.e. the insulating composition) used to prepare the layer. In one or more embodiments, the insulating composition may include at least 20% in other embodiments at least 50%, in other embodiments at least 60%, and in other embodiments at least 70% porous polymeric pigment on dry weight basis relative to the total weight of the composition. In these or other embodiments, the insulating composition may include at most 80% in other embodiments at most 90%, in other embodiments at most 95%, and in other embodiments at most 99% porous polymeric pigment on dry weight basis relative to the total weight of the composition. In one or more embodiments, the insulating composition may include from about 20% to about 99% porous polymeric pigment, in other embodiments from about 50% to about 95% porous polymeric pigment, in other embodiments from about 60% to about 90% porous polymeric pigment, and in other embodiments from about 70% to about 80% porous polymeric pigment on dry weight basis relative to the total weight of the composition.

In one or more embodiments, the insulating composition may be characterized by the amount of binder in the insulating composition based upon the dry weight of the insulating composition. In one or more embodiments, the insulating composition may include at least 1%, in other embodiments at least 5%, in other embodiments at least 10%, and in other embodiments at least 20% binder on dry weight basis. In these or other embodiments, the insulating composition may include at most 30% binder, in other embodiments at most 40% binder, in other embodiments at most 50% binder, and in other embodiments at most 80% binder on dry weight basis. In one or more embodiments, the insulating composition may include from about 1% to about 80% binder, in other embodiments from about 5% to about 50% binder, in other embodiments from about 10% to about 40% binder, and in other embodiments from about 20% to about 30% binder on dry weight basis.

In one or more embodiments, the insulating layer may include optional ingredients such as pigment or additives.

Examples of pigments include kaolin, talc, calcined clay, structured clay, ground calcium carbonate, precipitated calcium carbonate, titanium dioxide, aluminum trihydrate, satin white, hollow polymeric pigment, solid polymeric pigment, silica, zinc oxide, barium sulfate, and mixtures thereof.

In one or more embodiments, where the optional pigment is a hollow polymeric pigment, the hollow polymeric pigment may be prepared by an acid core process or an ester core process. Examples of hollow polymeric pigments produced using an acid core process can be found in U.S. Pat. No. 4,468,498 to Kowalski, which is incorporated herein by reference in its entirety. Examples of hollow polymeric pigments produced using an ester core process can be found in U.S. Pat. No. 5,157,084 to Lee and U.S. Pat. No. 5,521,253 to Lee, both of which are incorporated herein by reference in their entirety.

Examples of additives include conventional thickeners, dispersants, dyes and/or colorants, preservatives, biocides, anti-foaming agents, optical brighteners, wet strength agents, lubricants, water retention agents, crosslinking agents, surfactants, and pH control agents, and mixtures thereof.

The insulating layer may be applied to the substrate using a number of different coating techniques. Examples of these techniques include rod, grooved rod, curtain coating, stiff blade, applicator roll, fountain, jet, short dwell, slotted die, bent blade, bevel blade, air knife, bar, gravure, size press (conventional or metering), spray application techniques, wet stack, and/or application during the calendering process. Other coating techniques are also possible. After the insulating layer is applied to the substrate the insulating layer may then be dried. Drying of the insulating layer can be accomplished by convection, conduction, radiation, and/or combinations thereof.

In certain embodiment, where the image forming layer includes a leuco dye and/or a developer, the leuco dye and/or a developer may melt together when an image is formed on the thermosensitive recording material. As noted above, the thermosensitive recording material may include a hybrid layer that provides both insulation and absorption. In these or other embodiments, the porous hollow particles, and optionally other pigments, may help to absorb the melted components from the thermosensitive recording layer during imaging. In certain embodiments, the optional absorption layer may include silica and/or alumina pigments.

Optional Absorption Layer

In these or other embodiments, an optional absorption layer may help to absorb the melted components from the thermosensitive recording layer during imaging. The optional absorption layer may include the porous particles. In certain embodiments, the optional absorption layer may include silica and/or alumina pigments.

Image-Forming Layer

In one or more embodiments, the image forming layer includes a dye or a dye and developing agent combination that changes color to produce a visible marking on the thermosensitive recording material upon when exposed to sufficient heat or pressure. In one more embodiments, the dye may be a leuco dye or a combination of a leuco dye and a developing agent.

Exemplary types of leuco dyes include triphenylmethane phthalide compounds, triallyl methane compounds, fluoran compounds, phenothiazine compounds, thiofluoran compounds, xanthen compounds, indophthalyl compounds, spiropyran compounds, azaphthalide compounds, chromenopyrazole compounds, methine compounds, rhodamine aniline lactum compounds, rhodamine lactum compounds, quinazoline compounds, diazaxanthen compounds, and bislactone compounds.

Specific examples of leuco dyes include, 2-anilino-3-methyl-6-diethylaminofluoran, 2-anilino-3-methyl-6-(di-n-butylamino)fluoran, 2-anilino-3-methyl-6-(di-n-pentylamino)fluoran, 2-anilino-3-methyl-6-(N-n-propyl-N-methylamino)fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methyl amino)fluoran, 2-anilino-3-methyl-6-(N-sec-butyl-N-ethyl amino)fluoran, 2-anilino-3-methyl-6-(N-n-amyl-N-ethyl amino)fluoran, 2-anilino-3-methyl-6-(N-iso-amyl-N-ethyl amino)fluoran, 2-anilino-3-methyl-6-(N-cyclohexyl-N-methyl amino)fluoran, 2-anilino-3-methyl-6-(N-ethyl-p-toluidino)fluoran, 2-anilino-3-methyl-6-(N-methyl-p-toluidino)fluoran, 2-(m-trichloromethyl anilino)-3-methyl-6-diethyl aminofluoran, 2-(m-trifluoromethyl anilino)-3-methyl-6-diethyl aminofluoran, 2-(m-trifluoromethyl anilino)-3-methyl-6-(N-cyclohexyl-N-methyl amino)fluoran, 2-(2,4-dimethyl anilino)-3-methyl-6-diethyl aminofluoran, 2-(N-ethyl-p-toluidino)-3-methyl-6-(N-ethyl anilino)fluoran, 2-(N-methyl-p-toluidino)-3-methyl-6-(N-propyl-p-toluidino) fluoran, 2-anilino-6-(N-n-hexyl-N-ethyl amino)fluoran, 2-(o-chloranilino)-6-diethyl aminofluoran, 2-(o-bromoanilino)-6-diethyl aminofluoran, 2-(o-chloranilino)-6-dibutylaminofluoran, 2-(o-fluoroanilino)-6-dibutylaminofluoran, 2-(m-trifluoromethyl anilino)-6-diethylaminofluoran, 2-(p-acetylanilino)-6-(N-n-amyl-N-n-butylamino)fluoran, 2-benzylamino-6-(N-ethyl-p-toluidino) fluoran, 2-benzylamino-6-(N-methyl-2,4-dimethyl anilino) fluoran, 2-benzylamino-6-(N-ethyl-2,4-dimethyl anilino) fluoran, 2-dibenzylamino-6-(N-methyl-p-toluidino)fluoran, 2-dibenzylamino-6-(N-ethyl-p-toluidino) fluoran, 2-(di-p-methyl benzylamino)-6-(N-ethyl-p-toluidino)fluoran, 2-(α-phenylethyl amino)-6-(N-ethyl-p-toluidino)fluoran, 2-methyl amino-6-(N-methyl anilino)fluoran, 2-methyl amino-6-(N-ethyl anilino)fluoran, 2-methyl amino-6-(N-propylanilino)fluoran, 2-ethyl amino-6-(N-methyl-p-toluidino)fluoran, 2-methyl amino-6-(N-methyl-2,4-dimethyl anilino)fluoran, 2-ethyl amino-6-(N-methyl-2,4-dimethyl anilino)fluoran, 2-dimethyl amino-6-(N-methyl anilino) fluoran, 2-dimethyl amino-6-(N-ethyl anilino)fluoran, 2-diethyl amino-6-(N-methyl-p-toluidino)fluoran, benzo leuco methylene blue, 2-[3,6-bis(diethyl amino)]-6-(o-chloranilino)xanthyl benzoic acid lactam, 2-[3,6-bis(diethyl amino)]-9-(o-chloranilino)xanthyl benzoic acid lactam, 3,3-bis(p-dimethyl aminophenyl)phthalide, 3,3-bis(p-dimethyl aminophenyl)-6-dimethyl aminophthalide, 3,3-bis(p-dimethyl aminophenyl)-6-diethyl aminophthalide, 3,3-bis(p-dimethyl aminophenyl)-6-chlorphthalide, 3,3-bis(p-dibutylaminophenyl) phthalide, 3-(2-methoxy-4-dimethyl aminophenyl)-3-(2-hydroxy-4,5-dichlorphenyl) phthalide, 3-(2-hydroxy-4-dimethyl aminophenyl)-3-(2-methoxy-5-chlorphenyl) phthalide, 3-(2-hydroxy-4-dimethoxyaminophenyl)-3-(2-methoxy-5-chlorphenyl)phthalide, 3-(2-hydroxy-4-dimethylanophenyl)-3-(2-methoxy-5-nitrophenyl) phthalide, 3-(2-hydroxy-4-diethyl aminophenyl)-3-(2 methoxy-5-methyl phenyl)phthalide, 3,6-bis(dimethyl amino)fluorenespiro(9,3')-6'-dimethyl aminophthalide, 6'-chloro-8'-methoxy-benzoindolino-spiropyran, and 6'-bromo-2'-methoxy-benzoindolino-spiropyran.

Specific examples of developing agents for use with a leuco dye include, but are not limited to bisphenol A, tetrabromo bisphenol A, gallic acid, salicylic acid, 3-isopropyl salicylate, 3-cyclohexyl salicylate, 3,5-di-tert-butyl salicylate, 3,5-di-α-methylbenzyl salicylate, 4,4'-isopropylidenediphenol, 1,1'-isopropylidenebis(2-chlorophenol), 4,4'-isopropylidenebis(2,6-dibromophenol), 4,4'-isopropylidenebis(2,6-dichlorophenol), 4,4'-isopropylidenebis(2-methyl phenol), 4,4'-isopropylidenebis(2,6-dimethyl phenol), 4,4'-isopropylidenebis(2-tert-butylphenol), 4,4'-sec-butylidene diphenol, 4,4'-cyclohexylidene bisphenol, 4,4'-cyclohexylidene bis(2-methyl phenol), 4-tert-butylphenol, 4-phenylphenol, 4-hydroxy diphenoxide, α-naphthol, β-naphthol, 3,5-xylenol, thymol, methyl-4-hydroxybenzoate, 4-hydroxyacetophenone, novolak phenol resin, 2,2'-thiobis(4,6-dichlorophenol), catechol, resorcin, hydroquinone, pyrogallol, fluoroglycine, fluoroglycine carboxylic acid, 4-tert-octylcatechol, 2,2'-methylenebis(4-chlorophenol), 2,2'-methylenebis(4-methyl-6-tert-butylphenol), 2,2'-dihydroxydiphenyl, ethyl p-hydroxy benzoate, propyl p-hydroxy benzoate, butyl p-hydroxy benzoate, benzyl p-hydroxy benzoate, p-chlorobenzyl-p-hydroxy benzoate, o-chlorobenzyl-p-hydroxy benzoate, p-methyl benzyl-p-hydroxy benzoate, n-octyl-p-hydroxy benzoate, benzoic acid, zinc salicylate, 1-hydroxy-2-naphthoic acid, 2-hydroxy-6-naphthoic acid, zinc 2-hydroxy-6-naphthoate, 4-hydroxydiphenyl sulfone, 4-hydroxy-4'-chlorodiphenyl sulfone, bis(4-hydroxyphenyl)sulfide, 2-hydroxy-p-toluic acid, zinc 3,5-di-tert-butylsalicylate, tin 3,5-di-tert-butylsalicylate, tartaric acid, oxalic acid, maleic acid, citric acid, succinic acid, stearic acid, 4-hydroxyphthalic acid, boric acid, thiourea derivatives, 4-hydroxythiophenol derivatives, bis(4-hydroxyphenyl) acetic acid, ethyl bis(4-hydroxyphenyl)acetate, n-propyl-bis(4-hydroxyphenyl)acetate, n-butyl-bis(4-hydroxyphenyl)acetate, phenyl bis(4-hydroxyphenyl) acetate, benzyl bis(4-hydroxyphenyl)acetate, phenethyl bis (4-hydroxyphenyl)acetate, bis(3-methyl-4-hydroxyphenyl) acetic acid, methyl bis(3-methyl-4-hydroxyphenyl)acetate, n-propyl-bis(3-methyl-4-hydroxyphenyl)acetate, 1,7-bis(4-hydroxyphenylthio)-3,5-dioxaheptane, 1,5-bis(4-hydroxyphenylthio)-3-oxaheptane, dimethyl 4-hydroxy phthalate, 4-hydroxy-4'-methoxydiphenyl sulfone, 4-hydroxy-4'-ethoxydiphenyl sulfone, 4-hydroxy-4'-isopropxydiphenyl sulfone, 4-hydroxy-4'-propxydiphenyl sulfone, 4-hydroxy-4'-butoxydiphenyl sulfone, 4-hydroxy-4'-isopropxydiphenyl sulfone, 4-hydroxy-4'-sec-butoxydiphenyl sulfone, 4-hydroxy-4'-tert-butoxydiphenyl sulfone, 4-hydroxy-4'-benzyloxydiphenyl sulfone, 4-hydroxy-4'-phenoxydiphenyl sulfone, 4-hydroxy-4'-(m-methyl benzyloxy)diphenyl sulfone, 4-hydroxy-4'-(p-methyl benzyloxy)diphenyl sulfone, 4-hydroxy-4'-(o-methyl benzyloxy)diphenyl sulfone, 4-hydroxy-4'-(p-chlorobenzyloxy)diphenyl sulfone, and 4-hydroxy-4'-oxyallyldiphenyl sulfone.

In one or more embodiments, the image forming layer may include a sensitizer. A sensitizer may be employed to lower the thermal threshold of the image forming layer. Suitable sensitizer may melt at a temperature of about 80° C. to about 120° C., and in other embodiments about 90° C. to about 110° C. An exemplary class of sensitizers include organic either compounds. Examples of either compounds include 1,2-bis-(3-methylphenoxy) ethane and 2-benzyloxynapthalene.

In one or more embodiments, the image forming layer may include a stabilizer. In certain embodiments, a leuco dye may be unstable in its visible, colored, form. Stabilizers may be used to inhibit the loss of color or return of the leuco dye to its colorless form.

In one or more embodiments, the image forming layer may include optional components such as pigments, additives or binders.

What is claimed is:

1. A thermosensitive recording material comprising:
a support;
an insulating layer disposed directly or indirectly on the support, where the insulating layer includes porous hollow particles, where the porous hollow particles have a pore surface area of at least 1%, where the porous hollow particles have a void volume fraction of about 40% to about 85%, where the porous hollow particles are prepared by a process that includes subjecting a core-shell polymeric particle to conditions that will hydrolyze units deriving from the polymerization of acrylate monomer; where the core-shell polymeric particle includes a core with units deriving from the polymerization of acrylate monomer, acrylic acid monomer, or a combination thereof; and a shell surrounding the core, where the shell includes a polymer having units deriving from the polymerization of styrene monomer and acrylate monomer; and
an image-forming layer disposed directly or indirectly on the insulating layer.

2. The thermosensitive recording material of claim 1, where the porous hollow particles have a pore surface area of at least 5%.

3. The thermosensitive recording material of claim 1, further comprising an absorption layer disposed between the insulating layer and the image-forming layer.

4. The thermosensitive recording material of claim 3, where the absorption layer includes further porous hollow particles.

5. The thermosensitive recording material of claim 1, where the porous hollow particles have a polystyrene shell.

6. The thermosensitive recording material of claim 1, where the shell includes polymer having from 70 to 98 weight of the units deriving from the polymerization of styrene monomer, and from 2 to 30 weight of the units deriving from the polymerization of acrylate monomer.

7. The thermosensitive recording material of claim 1, where the shell includes polymer having from 80 to 95 weight of the units deriving from the polymerization of styrene monomer, and from 5 to 20 weight of the units deriving from the polymerization of acrylate monomer.

8. The thermosensitive recording material of claim 1, where the shell includes polymer having from 85 to 90 weight of the units deriving from the polymerization of styrene monomer, and from 10 to 15 weight of the units deriving from the polymerization of acrylate monomer.

9. The thermosensitive recording material of claim 1, where the shell is produced in the presence of less than 4% weight units of acrylic acid monomer.

10. The thermosensitive recording material of claim 1, where the acrylate in the shell is selected from methyl acrylate, ethyl acrylate, butyl acrylate, hexyl acrylate, 2-ethyl hexyl acrylate, octyl acrylate and iso-octyl acrylate, n-decyl acrylate, iso-decyl acrylate, tertbutyl acrylate, 2-hydroxyethyl acrylate, and acrylamide.

11. The thermosensitive recording material of claim 1, where the core of the core-shell polymeric particle has units deriving from the polymerization of acrylate monomer.

12. The thermosensitive recording material of claim 1, where the core of the core-shell polymeric particle has units deriving from the polymerization of acrylic acid monomer.

13. A thermosensitive recording material comprising:
a support;
an insulating layer disposed directly or indirectly on the support;
an absorption layer disposed directly or indirectly on the insulating layer, where the absorption layer includes porous hollow particles, where the porous hollow particles have a pore surface area of at least 1%, where the porous hollow particles have a void volume fraction of about 40% to about 85%, where the porous hollow particles are prepared by a process that includes subjecting a core-shell polymeric particle to conditions that will hydrolyze units deriving from the polymerization of acrylate monomer; where the core-shell polymeric particle includes a core with units deriving from the polymerization of acrylate monomer, acrylic acid monomer, or a combination thereof; and a shell surrounding the core, where the shell includes a polymer having units deriving from the polymerization of styrene monomer and acrylate monomer; and
an image-forming layer disposed directly or indirectly on the absorption layer.

14. The thermosensitive recording material of claim 13, where the porous hollow particles are prepared by a process that includes subjecting a core-shell polymeric particle to conditions that will hydrolyze units deriving from the polymerization of acrylate monomer; where the core-shell polymeric particle includes a core with units deriving from the polymerization of acrylate monomer, acrylic acid monomer, or a combination thereof; and a shell surrounding the core, where the shell includes a polymer having units deriving from the polymerization of styrene monomer and acrylate monomer.

15. The thermosensitive recording material of claim 13, where the insulating layer includes further porous hollow particles.

16. The thermosensitive recording material of claim 1, where the conditions that will hydrolyze the units deriving from the polymerization of acrylate monomer, include a temperature of at least 100° C.

17. The thermosensitive recording material of claim 1, where the conditions that will hydrolyze the units deriving from the polymerization of acrylate monomer, include a temperature of at least 140° C.

* * * * *